(12) United States Patent
Lewin et al.

(10) Patent No.: US 10,860,351 B1
(45) Date of Patent: Dec. 8, 2020

(54) BROWSER HOOKS ON OBJECTS IN WEB PAGES

(71) Applicant: MICROSOFT TECHNOLOGY LICENSING, LLC, Redmond, WA (US)

(72) Inventors: Guy Lewin, Tel Aviv (IL); Vitaly Khait, Yavne (IL); Yossef Haber, Gannei Tikva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/717,757

(22) Filed: Dec. 17, 2019

(51) Int. Cl.
*G06F 9/455* (2018.01)
*G06F 16/955* (2019.01)
*G06F 16/958* (2019.01)

(52) U.S. Cl.
CPC ........ *G06F 9/45529* (2013.01); *G06F 16/955* (2019.01); *G06F 16/958* (2019.01)

(58) Field of Classification Search
CPC ................. G06F 9/45516–9/45537; G06F 16/955–16/986
See application file for complete search history.

(56) References Cited

U.S. PATENT DOCUMENTS

| | | | | |
|---|---|---|---|---|
| 8,285,808 B1* | 10/2012 | Joel | ...................... | G06F 16/9577 709/213 |
| 8,613,089 B1* | 12/2013 | Holloway | ........... | H04L 63/1425 726/23 |
| 2016/0182517 A1* | 6/2016 | Sullivan | .............. | H04L 67/2842 713/171 |
| 2018/0013848 A1* | 1/2018 | Schejter | .............. | G06F 16/9535 |

* cited by examiner

*Primary Examiner* — Clayton R Williams
(74) *Attorney, Agent, or Firm* — Workman Nydegger

(57) ABSTRACT

Inserting a browser hook in a web page document or a script document for conditionally replacing a script object by a proxy object. In response to a determination that at least one element node of the web page document includes a script, for each of the at least one element node, the web page document is modified by inserting a browser hook in the element node. In response to a request for accessing a script document or in response to a determination that the web page document embeds a script URL, the script document is modified by inserting a browser hook in the script document.

20 Claims, 14 Drawing Sheets

Figure 5A:
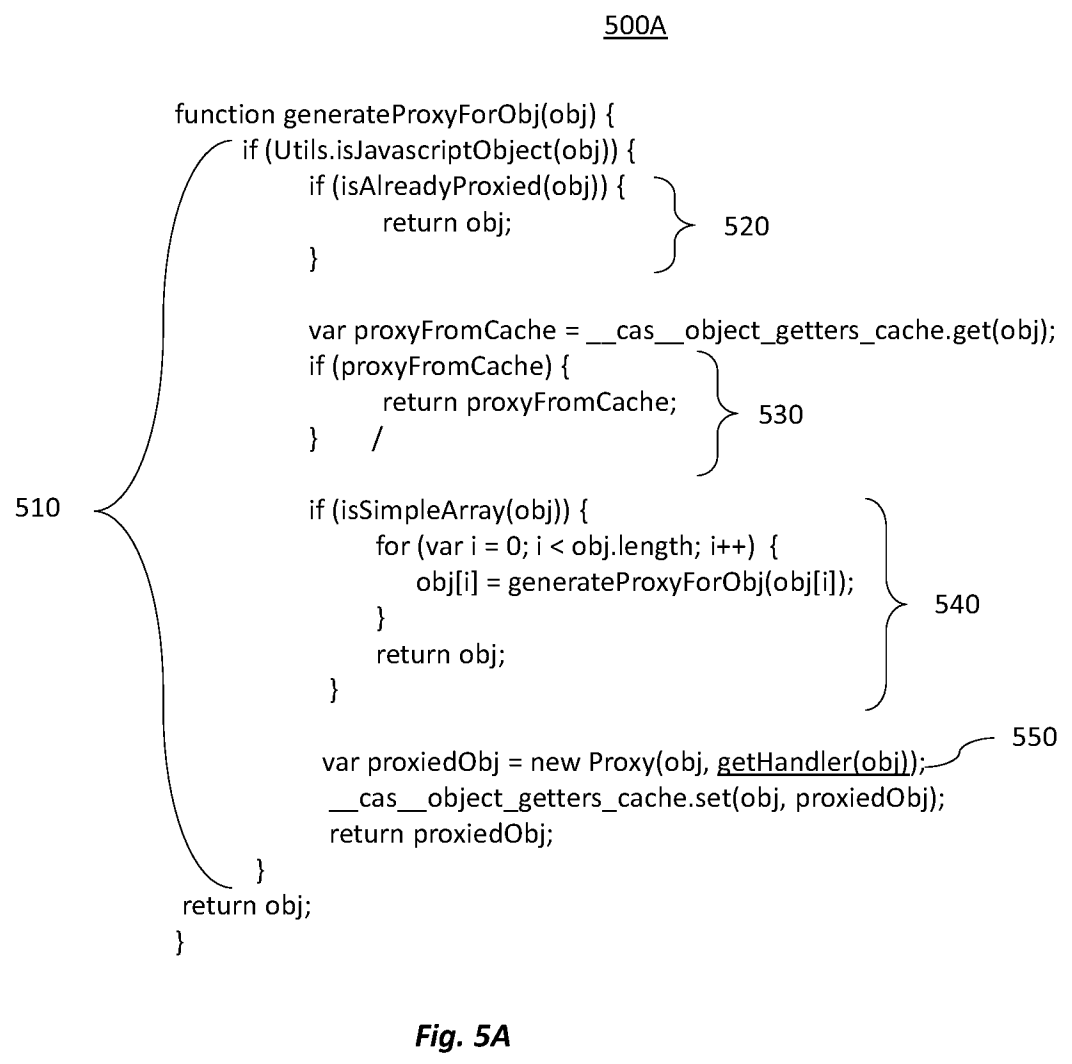

```
500A
function generateProxyForObj(obj) {
    if (Utils.isJavascriptObject(obj)) {
        if (isAlreadyProxied(obj)) {                                          ⎫
            return obj;                                                       ⎬ 520
        }                                                                     ⎭ var proxyFromCache = __cas__object_getters_cache.get(obj);            ⎫
        if (proxyFromCache) {                                                 ⎬ 530
            return proxyFromCache;                                            ⎭
        } if (isSimpleArray(obj)) {                                             ⎫
            for (var i = 0; i < obj.length; i++) {                            ⎪
                obj[i] = generateProxyForObj(obj[i]);                         ⎬ 540
            }                                                                 ⎪
            return obj;                                                       ⎭
        } var proxiedObj = new Proxy(obj, getHandler(obj));                     ⎫
        __cas__object_getters_cache.set(obj, proxiedObj);                     ⎬ 550
        return proxiedObj;                                                    ⎭
    }
    return obj;
}
```

```
function myGetHandler(target, p, originalObj, receiver, workaround) {
    var stringP = p.toString();
    // TODO: Only if native?
    if (receiver !== undefined) {
        if (isAlreadyProxied(receiver)) {
            receiver = getOriginalObj(receiver);
        } else if (stringP === "Symbol(Symbol.unscopables)") {
            return undefined;
        }
    }
    var getValue = Reflect.get(originalObj, p, receiver);
    if (simpleMethods.has(getValue)) {
        return getValue;
    }
    var ret = getValue;
    if (Utils.isHandledPropNG(originalObj, stringP)) {
        ret = Logic.valueGetters(originalObj, stringP, getValue);
    }
    if (!shouldProxyResult(ret)) {
        return ret;
    }
    return generateProxyForObj(ret);
}
```

*Fig. 5B*

```
500C function getHandler(originalObj) {
    return {
        get: function (target, p, receiver) {
            return myGetHandler(target, p, originalObj, receiver, false);
        },
        set: function (target, p, value, receiver) {
            return mySetHandler(target, p, value, target, receiver, false);
        },
        defineProperty: function(target, p, attributes) {
            return __cas__object_defineproperty_global.call(__cas__object_global, target, p, attributes);
        },
        apply: function (target, thisArg, argArray) {
            return myApplyHandler(thisArg, argArray, target);
        },
        construct: function(target, argArray, newTarget) {
            return myConstructorHandler(target, argArray, target, newTarget);
        }
    };
}
```

Fig. 5C

```
500D window.__MCAS_Proxy = (typeof Proxy !== "undefined") ? new Proxy({},
    getHandler(__cas__global_obj)) : undefined;
```

Fig. 5D

BROWSER HOOKS ON OBJECTS IN WEB PAGES

BACKGROUND

A web page is a file or document that may be accessed over a network by a client computing system (hereinafter also referred to as a "client"). A web page may be hosted at a web server (hereinafter also referred to as a "server"). The web server is a computing system that is configured to communicate with one or more clients via a computer network (e.g., the internet, or an intranet). A typical web page is a hypertext document (e.g., an HTML document) that contains text and hyperlinks, and may perhaps refer to scripts, multi-media documents, and so forth.

A web page may be a static web page or a dynamic web page. A static web page is a web page that is delivered to the user's web browser exactly as stored at the web server. In contrast, a dynamic webpage is a web page that may display different information to different users. Each time a dynamic web page is reloaded, some variable content may change depending on the context. Many modern web pages are dynamic.

As an example, a dynamic web page may be generated by a web application. A web application may have a client-side portion and a server-side portion. The client-side web application includes client-side logic, which may include execution of script embedded in the HTML. The server-side web application includes server-side logic. The client's web browser runs the client-side logic and/or script to access a web page that is hosted at the server. The server executes the server-side logic to determine how the assembly of the newly accessed web page is to proceed. As such, the dynamically presented information on the web page could come both from the server and from changes made to that webpage by the client.

Accordingly, such dynamically generated web pages may be difficult to monitor or control, therefore create potential security vulnerabilities. To mitigate the potential security vulnerabilities, proxy services may be implemented to serve as a gateway between the browser clients and the web servers. The proxy service intercepts the browser client's request for accessing a web page, and obtains, analyzes and sometimes modifies the web page before passing on the requested or modified web page to the browser client.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to browser hooks on objects in web pages. A browser hook is one or more additional lines of code that are inserted into a place in a web page document or in a script document that is embedded in the web page document to either cause the web page to behave differently or to react when something happens. Such embodiments may be implemented at a computing system, such as a proxy server that acts as a gateway between the browser client and the web server that hosts the web page document.

The computing system is configured to receive a request from a client (e.g., a web browser) for accessing a web page document or a script document. The request includes a URL that corresponds to a location where the web page document or a script document is hosted. In response to the request for accessing the web page document, the computing system retrieves the web page document (e.g., an HTML document) from a hosting server that hosts the web page document based on the URL. The web page document has a tree structure that includes a plurality of element nodes. The computing system determines whether at least one element node of the web page document contains a script (e.g., a script written in JavaScript) or embeds a script document via a URL of the script document (e.g., *.js document). A script or a script document includes instructions that are executable by the client (e.g., the browser client). In response to a determination that at least one element node contains a script, for each of the at least one element node, the computing system modifies the web page document by inserting a browser hook into the element node. The browser hook includes at least a predetermined line of code (e.g., JavaScript code) that is configured to wrap the script contained in the element node. The modified web page document is then sent to the client.

In response to the request for accessing a script document via a URL or in response to the determination that the web page embeds a script document via a URL, the computing system retrieves the script document from a hosting server that hosts the script document based on the URL and modifies the script document by inserting a browser hook in the script document. The modified script document may then be sent to the client.

In some embodiments, the sending the modified web page document or the modified script document may include storing the modified web page document or the modified script document at a location that is hosted by the computing system. The location corresponds to a new URL. The new URL is then sent to the client. In some embodiments, the new URL is generated by suffixing a domain name associated with the computing system to the original URL of the web page document or the script document.

The determining whether at least one element node contains a script or embeds a script document may include traversing each of the multiple element nodes of the web page document. For each of the multiple element nodes, the computing system determines whether the element node contains a script or embeds a script document. The determining whether the element node contains a script or embeds a script document may include determining whether the element node is tagged by at least one particular tag that indicates that the element node is a script document node.

For example, if the element node is tagged by a "<script>" tag, it may be determined that the element node contains a script written in JavaScript or embeds a script document via a URL of the script document. In response to a determination that at least one element node contains a script written in Javascript, for each of the at least one element node, the computing system may insert a browser hook that includes a JavaScript "with" statement before and after the script. The JavaScript "with" statement takes the script as a statement, such that the script is wrapped around by the JavaScript "with" statement. Similarly, in response to a determination that at least one element node embeds a script document via a URL, the computing system retrieves the script document based on the URL and insert the same browser hook into the script document.

Further, the browser hook is structured such that when executed by the client (e.g., a browser client), the browser hook causes the client to determine whether the script contained in the element node or the script document embedded in the element node includes at least one script object. In response to a determination that the script includes at least one script object, for each of the at least one script object, it is then determined whether the script object meets one or more predetermined conditions. In response to a determination that the script object meets at least one of the one or more predetermined conditions, the script object may be replaced by a proxy object. The proxy object is formed by generating a new proxy object that wraps the script object.

The one or more predetermined conditions that trigger the replacement of an existing object by a new proxy object may include (but are not limited to): (1) the script object is not a proxy object, (2) a cached proxy object that corresponds to the script object is not found, (3) the script object is not a primitive object, (4) the script object is not an array, (5) the script object is a native object, and/or (6) the script object is a function object that is not on a whitelist of approved functions.

Additionally, if the script object is an array, it may be further determined whether the array contains at least one object element. In response to a determination that the array contains at least one object element, each of the at least one object element may then be traversed through the same process described above. For example, for each of the at least one object element, it may be determined that whether the script object element meets at least one of the one or more predetermined conditions, and in response to the determination that the corresponding object meets the at least one predetermined condition, the script object element may be replaced by a proxy object.

Existing proxy services often parse all the scripts embedded in each web page document to find particular functions or sections of code, and insert script hooks inside the script code. For example, a script hook may be inserted around each of the particular functions or sections of code. However, modern web page documents often contain a large amount of script code. Parsing such a large amount of script code for finding specific functions and inserting script hooks at each of these functions is resource-intensive. In some cases, it may take up to several minutes to finish inserting script hooks into the script code contained in a single web page.

Unlike the existing technologies that require the proxy server to parse all the script code contained in the web pages and to insert "script hooks" inside the script code, the principles described herein discloses inserting "browser hooks" into the web page document, which requires much fewer resources at the proxy server to process each web page document. In particular, only a line of code may be required to be inserted before and after each script code snippet embedded in the web page. The inserted browser hook is configured to cause the browser client to perform a recursive process to replace certain script objects by proxy objects. Thus, the principles described herein improve the functions of proxy services by avoiding having a proxy service to perform the resource-intensive tasks of parsing all the target script code and by distributing the computing tasks to each browser client that executes the corresponding browser hooks. The principles described herein also improve users' browsing experience, because the time required by the proxy service to process each web page document may be substantially reduced, such that the users can receive the modified web page document much faster compared to going through a traditional proxy server.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 5A illustrates an example proxy generating function that may be called by a browser hook inserted in the web page document;

FIGS. 5B and 5C illustrate example handler functions that may be called when a proxy object is to be generated;

FIG. 5D illustrates an example global variable that may be defined by recursively calling the proxy generating function and the handler functions;

DETAILED DESCRIPTION

Figure 1A:
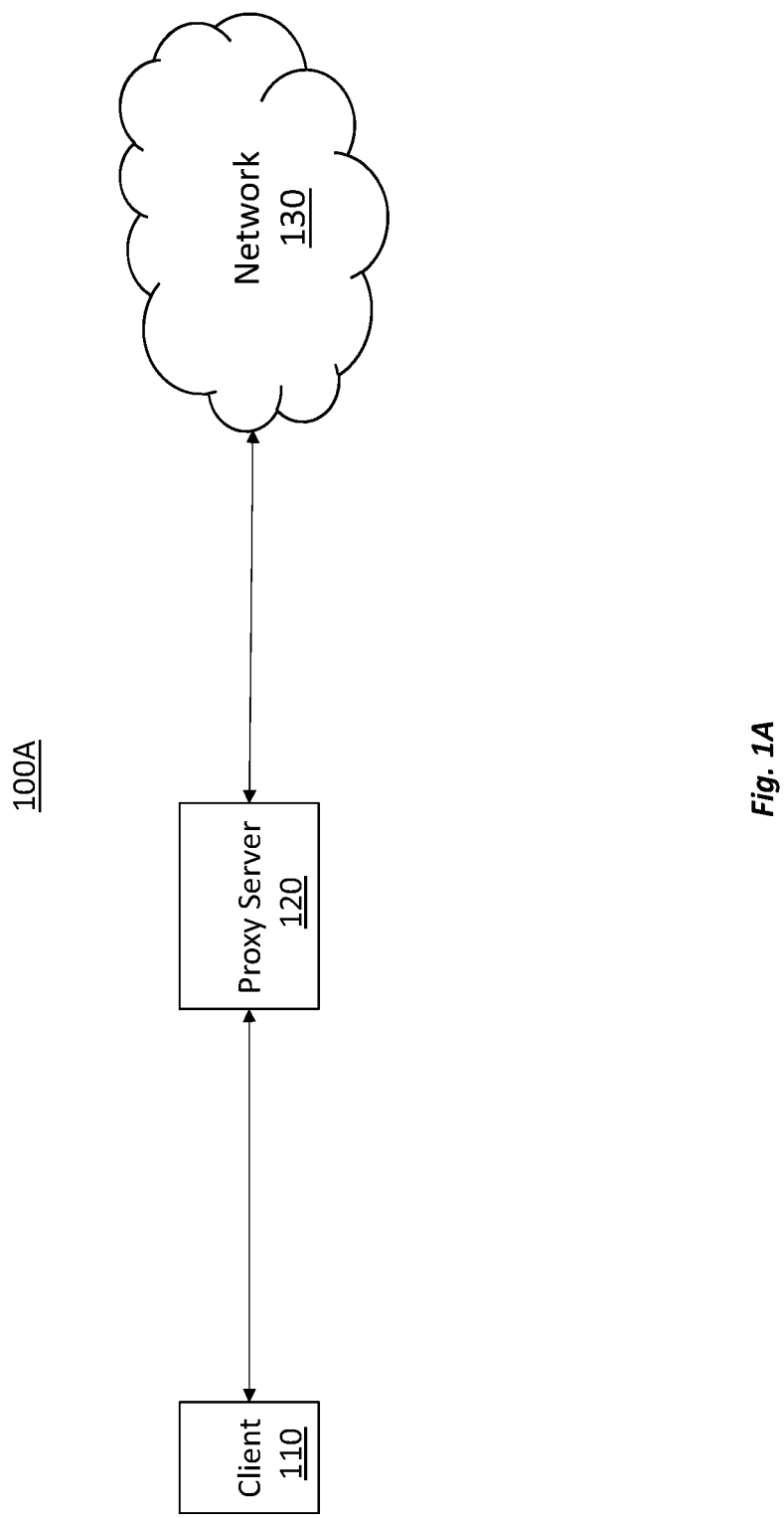
FIG. 1A illustrates an example environment in which a proxy server may be implemented.

The embodiments described herein are related to browser hooks on objects in web pages. A browser hook is one or more additional lines of code that are inserted into a place in a web page document or in a script document that is embedded in the web page document to either cause the web page to behave differently or to react when something happens. Such embodiments may be implemented at a computing system, such as a proxy server that acts as a gateway between the browser client and the web server that hosts the web page document.

The computing system is configured to receive a request from a client (e.g., a web browser) for accessing a web page document or a script document. The request includes a URL that corresponds to a location where the web page document or a script document is hosted. In response to the request for accessing the web page document, the computing system retrieves the web page document (e.g., an HTML document) from a hosting server that hosts the web page document based on the URL. The web page document has a tree structure that includes a plurality of element nodes. The computing system determines whether at least one element node of the web page document contains a script (e.g., a script written in JavaScript) or embeds a script document via a URL of the script document (e.g., *.js document). A script or a script document includes instructions that are executable by the client (e.g., the browser client). In response to a determination that at least one element node contains a script, for each of the at least one element node, the computing system modifies the web page document by inserting a browser hook into the element node. The browser hook includes at least a predetermined line of code (e.g., JavaScript code) that is configured to wrap the script contained in the element node. The modified web page document is then sent to the client.

In response to the request for accessing a script document via a URL or in response to the determination that the web page embeds a script document via a URL, the computing system retrieves the script document from a hosting server that hosts the script document based on the URL and modifies the script document by inserting a browser hook in the script document. The modified script document may then be sent to the client.

In some embodiments, the sending the modified web page document or the modified script document may include storing the modified web page document or the modified script document at a location that is hosted by the computing system. The location corresponds to a new URL. The new URL is then sent to the client. In some embodiments, the new URL is generated by suffixing a domain name associated with the computing system to the original URL of the web page document or the script document.

The determining whether at least one element node contains a script or embeds a script document may include traversing each of the multiple element nodes of the web page document. For each of the multiple element nodes, the computing system determines whether the element node contains a script or embeds a script document. The determining whether the element node contains a script or embeds a script document may include determining whether the element node is tagged by at least one particular tag that indicates that the element node is a script document node.

For example, if the element node is tagged by a "<script>" tag, it may be determined that the element node contains a script written in JavaScript or embeds a script document via a URL of the script document. In response to a determination that at least one element node contains a script written in Javascript, for each of the at least one element node, the computing system may insert a browser hook that includes a JavaScript "with" statement before and after the script. The JavaScript "with" statement takes the script as a statement, such that the script is wrapped around by the JavaScript "with" statement. Similarly, in response to a determination that at least one element node embeds a script document via a URL, the computing system retrieves the script document based on the URL and insert the same browser hook into the script document.

Further, the browser hook is structured such that when executed by the client (e.g., a browser client), the browser hook causes the client to determine whether the script contained in the element node or the script document embedded in the element node includes at least one script object. In response to a determination that the script includes at least one script object, for each of the at least one script object, it is then determined whether the script object meets one or more predetermined conditions. In response to a determination that the script object meets at least one of the one or more predetermined conditions, the script object may be replaced by a proxy object. The proxy object is formed by generating a new proxy object that wraps the script object.

The replacing the script object by a proxy object may include generating a new proxy object in JavaScript. The new proxy object takes the script object as its target. The proxy object may be structured such that when executed by the client, the proxy object may be monitored via a handler object. The monitoring of the proxy object may include detecting whether one or more particular events at the proxy object occur. In response to a detection of at least one of the one or more particular events occurring, an operation of the corresponding event may be caused to be blocked. Alternatively, or in addition, in response to a detection of at least one of the one or more particular events occurring, a new proxy object may be generated, such that a previously generated proxy object may be configured to cause an additional proxy object to be generated, which forms a recursive process.

The one or more predetermined conditions that trigger the replacement of an existing object by a new proxy object may include (but are not limited to): (1) the script object is not a proxy object, (2) a cached proxy object that corresponds to the script object is not found, (3) the script object is not a primitive object, (4) the script object is not an array, (5) the script object is a native object, and/or (6) the script object is a function object that is not on a whitelist of approved functions. In some embodiments, if a cached proxy object that corresponds to the script object is found, the script object may be replaced by the cached proxy object. In some embodiments, if the script object is a function object, a whitelist that contains a list of approved functions may be accessed, and it may then be determined whether the function object is on the whitelist. In response to a determination that the function object is not on the whitelist, the function object may then be replaced by a proxy object.

Additionally, if the script object is an array, it may be further determined whether the array contains at least one object element. In response to a determination that the array contains at least one object element, each of the at least one object element may then be traversed through the same process described above. For example, for each of the at least one object element, it may be determined that whether the script object element meets at least one of the one or more predetermined conditions, and in response to the determination that the corresponding object meets the at least one predetermined condition, the script object element may be replaced by a proxy object.

Existing proxy services often parse all the scripts embedded in each web page document to find particular functions or sections of code, and insert script hooks inside the script code. For example, a script hook may be inserted around each of the particular functions or sections of code. However, modern web page documents often contain a large amount of script code. Parsing such a large amount of script code for finding specific functions and inserting script hooks at each of these functions is resource-intensive. In some cases, it may take up to several minutes to finish inserting script hooks into the script code contained in a single web page.

Unlike the existing technologies that require the proxy server to parse all the script code contained in the web pages and to insert "script hooks" inside the script code, the principles described herein discloses inserting "browser hooks" into the web page document, which requires much fewer resources at the proxy server to process each web page document. In particular, only a line of code may be required to be inserted before and after each script code snippet embedded in the web page. The inserted browser hook is configured to cause the browser client to perform a recursive process to replace certain script objects by proxy objects. Thus, the principles described herein improve the functions of proxy services by avoiding having a proxy service to perform the resource-intensive tasks of parsing all the target script code and by distributing the computing tasks to each browser client that executes the corresponding browser hooks. The principles described herein also improve users' browsing experience, because the time required by the proxy service to process each web page document may be substantially reduced, such that the users can receive the modified web page document much faster compared to going through a traditional proxy server.

Since the principles described herein may be implemented at a proxy server, some introductory discussion about proxy servers will be described now with respect to FIGS. 1A-1C. FIG. 1A illustrates an example environment 100A, in which a proxy server 120 may be implemented. A proxy server may also be called a "proxy." A proxy is an intermediary that bridges two routes and/or paths in a cycle or process. For example, the proxy server 120 is used to bridge a client 110 and a computer network 130.

In addition to bridging the gap between two routes or paths, a proxy may also bridge two systems and perform various functions that are central to the process that the two systems are involved in. For example, a forward proxy is a proxy that generally acts on behalf of a client, and a reverse proxy is a proxy that generally acts on behalf of a server. Additional details about forward proxy servers and reverse proxy servers are further discussed below with respect to FIGS. 1B and 1C.

Figure 1B:
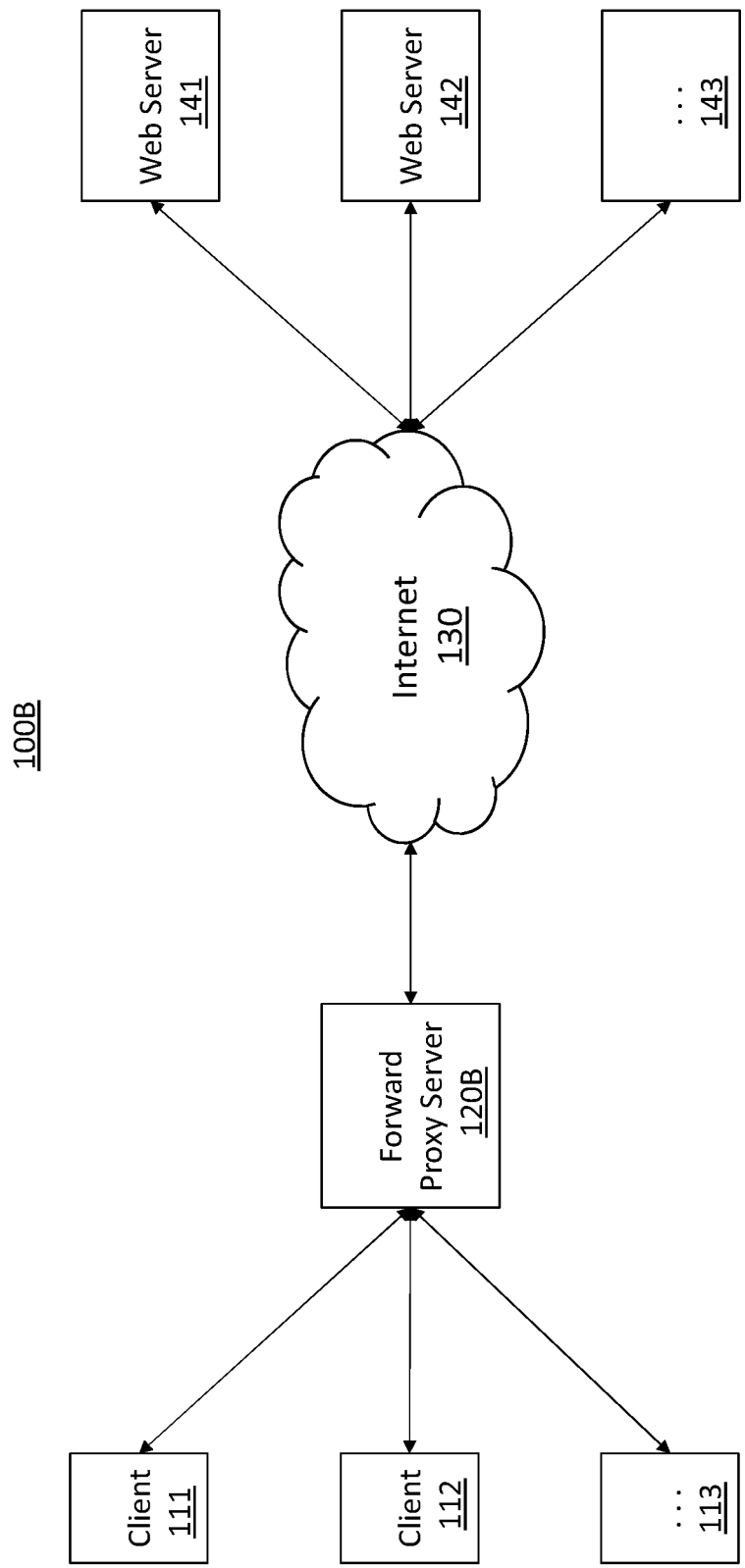
FIG. 1B illustrates an example environment in which a forward proxy server may be implemented.

FIG. 1B illustrates an example environment 100B, in which a forward proxy server 120B is implemented. As illustrated in FIG. 1B, the environment 100B may include multiple clients 111 and 112 and multiple web servers 141 and 142. The ellipsis 113 represents that there may be any number of clients in the environment 100B, and the ellipsis 143 represents that there may be any number of web servers in the environment 100B.

When a client 111 or 112 is to access one of the web servers 141 and 142, the client 111 or 112 may go through a forward proxy server 120B. This set up may be configured by a user of the client computing system 111 or 112. For example, a user may manually input a forward proxy server's IP address to force the browser to go through the forward proxy server 120B for each inquiry. Alternatively, an organization's IT administrator may set up the forward proxy server 120B within the organization's local network to force all the inquiries initiated through the organization's local network to go through the forward proxy server 120B.

The client 111 or 112 may request access to a web page hosted at one of the web servers 141 and 142. As illustrated in FIG. 1B, the request is not sent directly to the corresponding web server 141 or 142, but sent to the forward proxy server 120B. The forward proxy server 120B then forwards the request to the corresponding web server 141 or 142. After the web server 141 or 142 receives the request from the forward proxy server 120B, the web server 141 or 142 sends the requested web page to the forward proxy server 120B. Once the forward proxy server 120B receives the requested web page, it may determine whether this web page should be passed onto the requesting client 111 or 112.

For example, in the case that the forward proxy server 120B is managed by an administrator at a work environment, the employer may set up the forward proxy server 120B to block users from visiting specific sites, e.g., social networks, explicit sites, etc. The forward proxy server 120B may also be used by the administrator to monitor activities of users, e.g., employees' activities at work. The forward proxy server 120B may log all the employee's activities and detect potential anomalies.

As another example, a forward proxy server may also be used to unblock a site that is blocked or banned by an internet service provider (ISP) or government. For example, a government may prohibit users from accessing certain domains, but the users may use a forward proxy to unblock the domains that are blocked by the government. Further, a user may also use a forward proxy server 120B for masking their IP address to access the web servers 141 and 142.

Figure 1C:
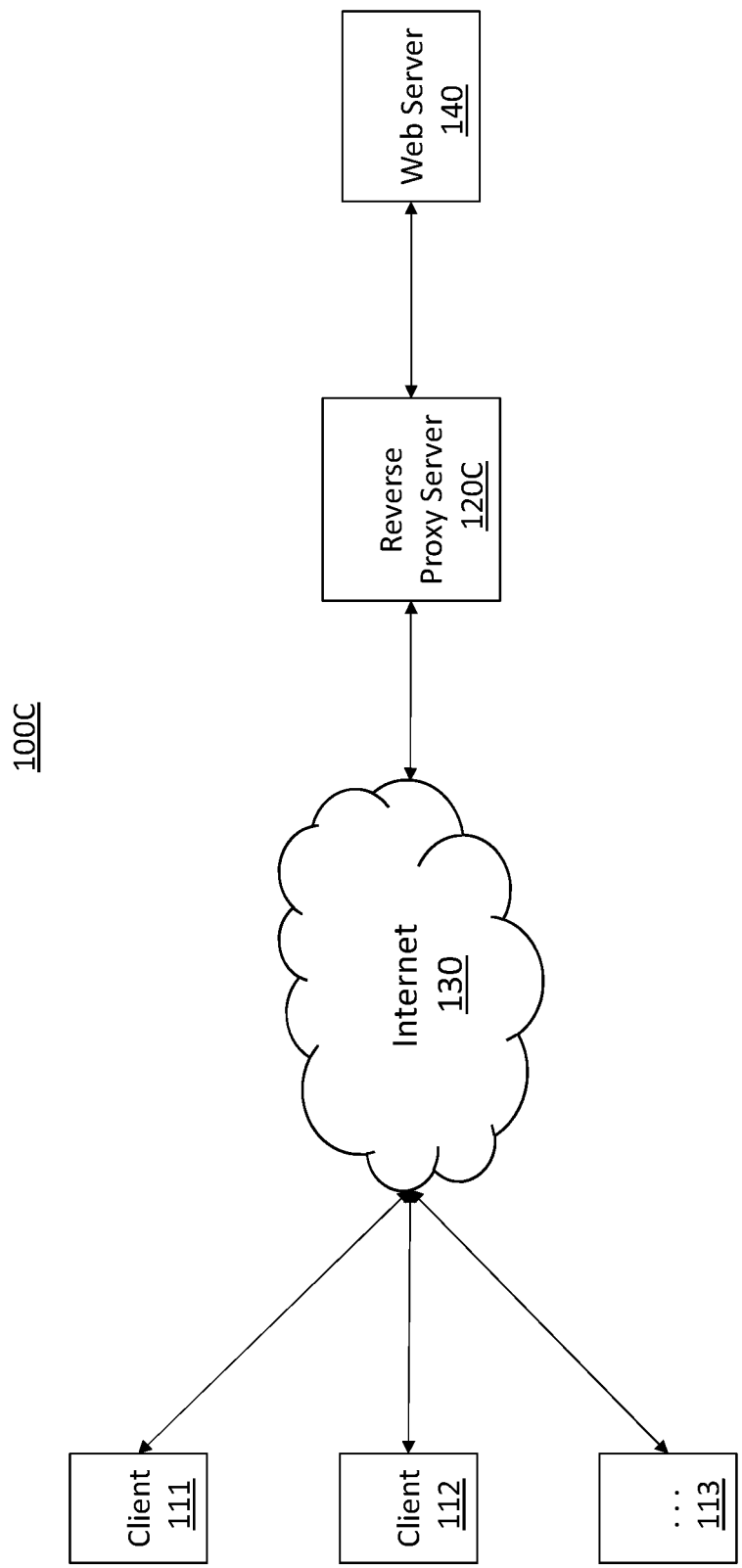
FIG. 1C illustrates an example environment in which a reverse proxy server may be implemented.

FIG. 1C illustrates an example environment 100C, in which a reverse proxy server 120C is implemented. Unlike the forward proxy server 120B, which is generally acting on behalf of a client to communicate with multiple servers, the reverse proxy server 120C is generally acting on behalf of a particular server to communicate with multiple clients 111 and 112. As illustrated in FIG. 1C, there are multiple clients 111 and 112 that are connected to the internet 130. The ellipsis 113 represents that there may be any number of clients in the environment 100C. The reverse proxy server 120C serves as a proxy to a particular web server 140. When each of the clients 111 and 112 requests for accessing the web server 140, the request is always sent to the reverse proxy server 220C first, and the reverse proxy server 120C may then forward the request to the web server 140.

In some embodiments, the reverse proxy server 120C may not need to forward the request to the web server 140. For example, the reverse proxy server 120C may act as a security guard that monitors the incoming clients' IP addresses and blocks certain IP addresses that are listed on a blacklist. The reverse proxy server 120C may also be used to achieve various additional functions including (but are not limited to) scrub traffic, mask the IP address of the web server, and/or improve site speed through content delivery network (CDN). For example, a CDN may have set up many redundant servers. The reverse proxy server 120C may be configured to forward the client request to one of the redundant servers that is the closest to the client. The reverse proxy server 120C may also be used to reduce the risk of exposing the web server 140 to intruders.

As another example, the reverse proxy server 120C may also serve as a cache server that caches the frequently visited web pages, and when a request for a frequently visited web page is received, the reverse proxy server 120C may send a cached web page to the client without having to access the web server 140. When a cashed web page is sent to the client 111 or 112, the reverse proxy server 120C may update the original URL of the web page to the URL of the cached content.

In some embodiments, the name of the reverse proxy server may be added to the end of the original URL as a suffix. For example, the original URL of the web page requested by the client 111 or 112 may be "abc.com", the reverse proxy server's URL may be "xyz.com", and the reverse proxy 120C may cache the web page at a location corresponding to a URL that looks like "abc.com.xyz.com", which adds the name of the proxy 120C to the end of the original URL. Such a proxy server that returns a URL that adds its own name to the end of the original URL may also be called a "suffix proxy".

Some suffix proxies are not only capable of caching the frequently visited web pages, but also capable of modifying a web page and storing the modified web page at a location that corresponds to a suffixed URL. When a browser requests for accessing the web page, the suffix proxy may redirect the browser to the suffixed URL. In such a case, the browser is caused to access the modified web page that may appear to be the same as the original web page, but indeed the modified web page may perform different operations or functions or behave differently than the original web page.

Figure 2:
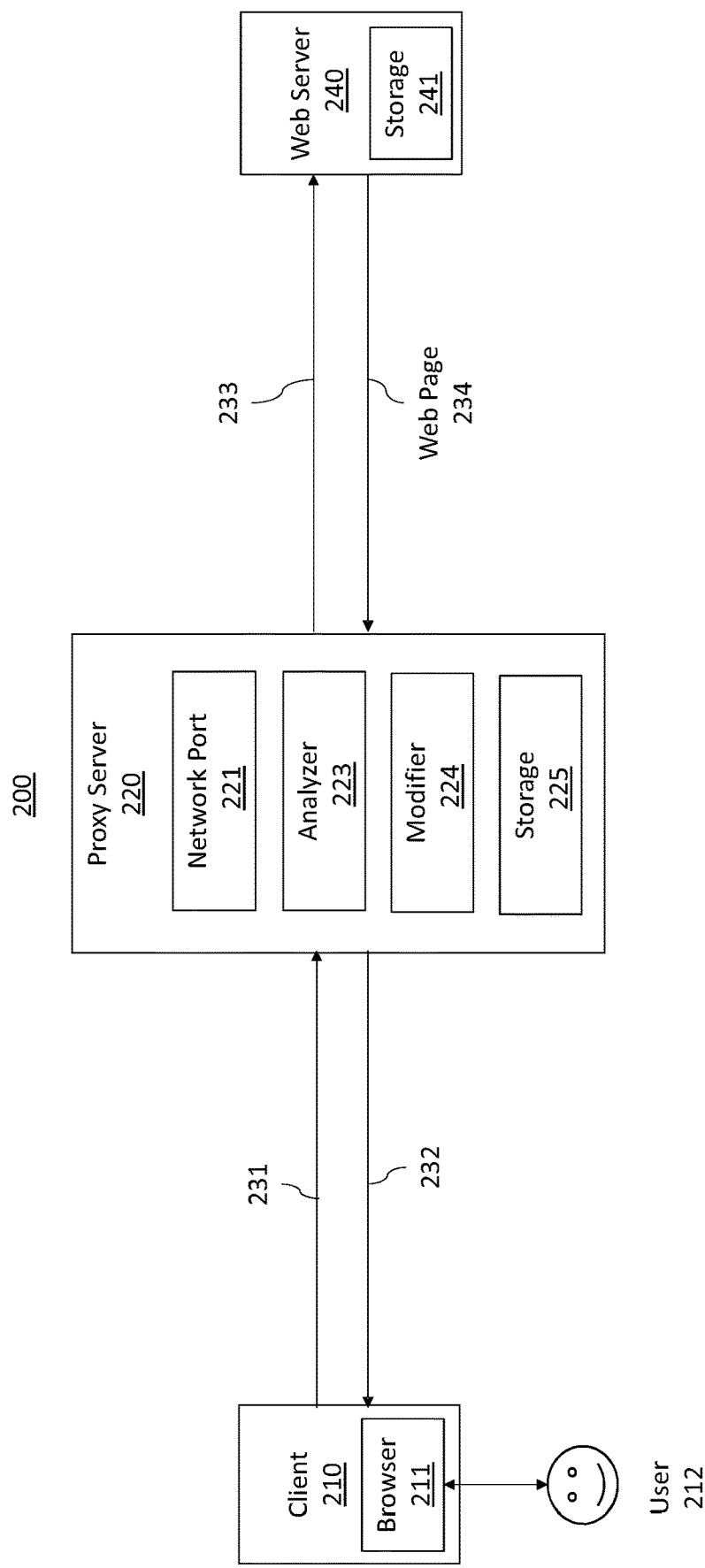
FIG. 2 illustrates an example environment including a proxy server, in which the principles described herein may be implemented.

After the above introductory discussion about proxy servers, a discussion will now describe how browser hooks may be inserted into the web pages by using a proxy server with respect to FIG. 2. As briefly discussed above, a browser hook is one or more lines of code that are inserted into a place in a web page document to either cause the web page to behave differently or to react when some event occurs. FIG. 2 illustrates an example environment 200 that includes a proxy server 220 that may implement the principles described herein. The proxy server 220 may correspond to a proxy server 120 of FIG. 1A, a forward proxy server 120B of FIG. 1B, and/or a reverse proxy server 100C of FIG. 1C.

As illustrated in FIG. 2, the environment 200 includes a client 210, a proxy server 220, and a web server 240. The proxy server 220 includes a network port 221. The network port 221 may be configured to listen to the incoming communication from the client 210 and/or the web server 240. The network port 221 may also allow the proxy server 220 to send messages and/or data to the client 210 and/or the web server 240.

The client 210 may be used by a user 212. A browser application 211 may be installed at the client 210. The user 212 may open the browser application 211 to browse various web sites. For example, a user 212 (who is using the client 210) may request access to a particular web page by entering a URL in the browser 211. The URL is then sent to the proxy server 220, and the proxy server 220 receives the URL via the network port 221. The communication of sending the URL to the proxy server 220 is represented by the arrow 231. After the proxy server 220 receives the URL from the client 210, the proxy server 220 passes on the request to the server 240, which is represented by arrow 233.

The web server 240 includes a storage 241 that stores one or more web pages. When the web server 240 receives the request from the proxy server 220, it retrieves the web page document (e.g., an Html document) from the storage 241 based on the URL of the web page. The retrieved web page document is then sent to the proxy server 220, which is represented by arrow 234.

After the proxy server 220 receives the web page document, it does not necessarily pass on the web page document to the client 210. Instead, the proxy server 220 may first analyze the web page document by an analyzer 223. The web page document (e.g., an Html document) often has a tree structure according to the Document Object Model (DOM). The tree-structured web page document includes multiple element nodes. Each of the multiple element nodes may be tagged by a tag. For example, the root node of the web page document may be tagged by an "<html>" tag and a JavaScript document element may be tagged by a "<script>" tag.

The analyzer 223 is configured to determine whether at least one of these multiple element nodes of the web page document contains a script. Various methods may be performed to achieve this goal. As an example, the analyzer 223 may traverse each of the element nodes to determine whether each of the element nodes contains a script. Since a script is likely to be tagged by a particular tag, the analyzer 223 may analyze the tag of each of the element nodes to determine whether the tag is the particular tag. For example, when an element node is tagged by a "<script>" tag, it indicates that the content contained in the element node is likely to be a script written in JavaScript. The analyzer 223 may traverse each of the tags to determine whether at least one "<script>" tag exists.

Further, the proxy server 220 also includes a modifier 224. The modifier 224 is configured to modify the web page document in response to a determination that at least one element node contains a script. In particular, for each of the at least one element node that contains a script, the modifier 224 is configured to insert a browser hook into the corresponding element node. The browser hook may be as simple as one line of code that is inserted before and after the corresponding script, such that the corresponding script is "wrapped" by the browser hook. "Wrapping" is a programming technique that may be used to isolate script context so that a function contained in the script is limited to its own properties. Here, the browser hook is used to wrap the script, such that the functions and objects contained in the script are limited to the context that the browser hook may define.

The modified web page document may be stored at a location in the storage 225, and the URL corresponding to the location in the storage 225 that is associated with the proxy server 220 may then be sent to the client 210, which is represented by the arrow 232. In some embodiments, the proxy server 220 may be a suffix proxy. The location in the storage 225 that stores the modified web page document may thus be referred to by a URL that suffixes the proxy server's 220 domain to the URL of the original web page document. For example, the web server 240 may have a domain name "abc.com", the requested web page may have a URL of "abc.com/webpage.html", and the proxy server 220 may have a domain name "cas.ms." As such, the new URL generated by the suffix proxy server 220 may look similar to "abc.com.cas.ms/webpage.html" because the proxy server's URL is appended to the domain of requested webpage. The new URL may then be sent to the web browser 211 of the client 210. The browser 211 may then load the modified web page document to display the content of the modified web page.

When the browser 211 at the client 210 receives the modified web page document, the browser 211 is caused to execute the "hook-wrapped" script. The "hook-wrapped" script is the modified script code containing both the inserted browser hook and the original script. The inserted hook causes the browser 211 to determine whether the wrapped script includes at least one object. In response to a determination that the hook-wrapped object includes at least one object, for each of the at least one object, the browser 211 is further caused to determine whether the script object meets one or more predetermined conditions. If it is determined that the script object meets at least one of the one or more predetermined conditions, the script object may then be replaced by a proxy object.

Figure 3:
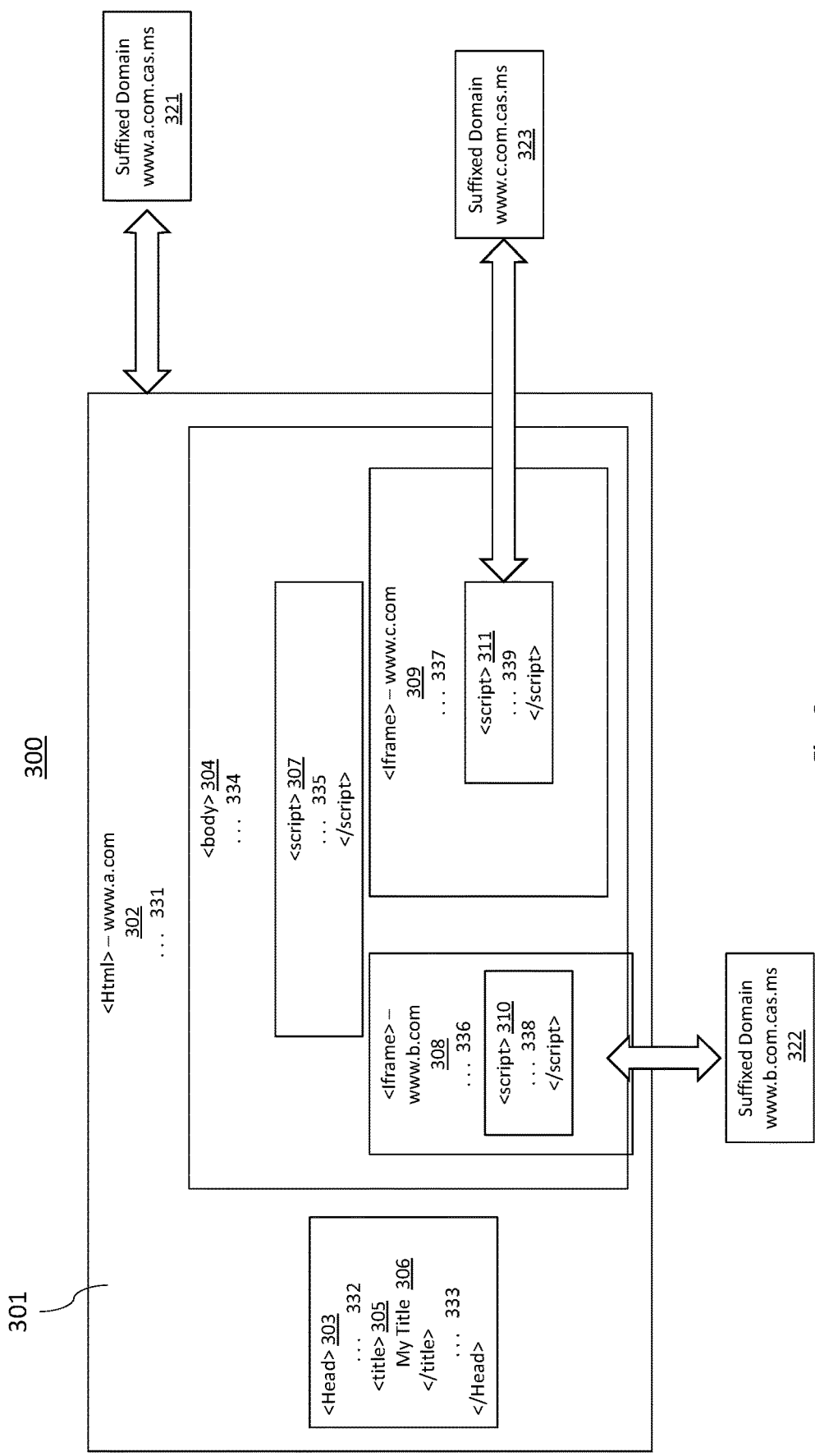
FIG. 3 illustrates an example web page document that may be modified by a proxy server or may embed a script document that may be modified by the proxy server.

Additional details about the structure of a web page document, and how the proxy server 220 can retrieve, analyze, and modify the web page document will now be further described with respect to FIG. 3. FIG. 3 illustrates an example web page document 300, which is in HTML, format. The web page document 300 includes multiple element nodes organized according to the Element node Model (DOM). DOM is a model that treats an HTML document as a tree structure. Each of the multiple element nodes is an element node of the tree structure.

For example, the web page document 300 has a root node 302 tagged by a <html> tag. The root node 302 is an iframe that has a source attribute of "www.a.com." Since the root node 302 is the root node, it may also be called a root frame.

The root frame 302 includes two child element nodes 303 and 304, each of which is tagged respectively by a <head> tag and a <body> tag. The <head> element node 303 further includes a child element node 305, which is tagged by a <title> tag, and the title element node 305 also includes a child element node, which is a text element node 306 that contains the text of "My Title."

Similarly, the body element node 304 also includes several child element nodes 307-309. Child element node 307 is tagged by a <script> tag, which indicates that the element node contains JavaScript code. Each of the child element node 308 and 309 is tagged by a <iframe> tag, each of which has a respective source attribute of "www.b.com" and "www.c.com." Further, each of the iframe element nodes 308 and 309 also includes a respective child script element node 310 or 311.

Since the root frame 302 has a source attribute of www.a.com, the web page document 300 is stored at the web server having a domain name of www.a.com. When a user 212 enters a URL of the web page (e.g., www.a.com/webpage.html) at the browser 211, the browser sends the request to the proxy server 220 that hosts the domain www.a.com. In response to the request, the proxy server 220 communicates with the web server 240 that hosts the domain www.a.com and obtains the web page document 300 from the web server 240.

After the web page document 300 is received, the analyzer 223 of the proxy server 220 analyzes the web page document 330. Based on the tree structure of the web page document 300, the analyzer 223 may traverse each element node of the DOM tree, and determines whether there is any script contained in the web page document 300. In this case, the element node 307 is likely to be found as containing a script. In response to the finding of the element node 307, the modifier 224 may then insert a line of predetermined script code before and after the script contained in the element node 307 to wrap the script.

The modified web page document 300 may then be stored at a location in the storage 225. The location may correspond to a new domain URL that suffixes the original web page document's URL with the proxy server's URL. For example, if the suffix server's URL is www.cas.ms, and the original web page's domain URL is www.a.com, the new URL may be www.a.com.cas.ms 321. In particular, if the original web page's URL is www.a.com/webpage.html, the suffixed web page URL may be www.a.com.cas.ms/webpage.html.

The analyzer 223 may further analyze the web page document 300 and find out that there are two iframe element nodes in the web page 300. An iframe element node is used to embed another web page document within the current web page document. As illustrated in FIG. 3, the iframe element node 308 embeds another web page document that is hosted at domain www.b.com, and the iframe element node 309 embeds another web page document that is hosted at domain www.c.com.

In such a case, the proxy server 220 will contact each of the domains servers www.b.com and www.c.com to obtain the corresponding web page document embedded in the corresponding iframe element node 308 or 309. Once the proxy server 220 receives the web page document embedded in iframe 308 or iframe 309, the proxy server 220 will repeat the process described above, and modify and store the corresponding web page document accordingly. For example, for iframe 308, the analyzer 223 would determine that the script element node 310 contains a script, and the modifier 224 would insert the browser hook before and after the script contained in the element node 310 to wrap the script. Further, the modified web page document may also be stored at a location in the storage 225 corresponding to a suffixed URL that suffixes the proxy server's URL to the original document's URL. In this case, since the original web page document has a domain www.b.com, the suffixed URL would be under a domain www.b.com.cas.ms 322.

Similarly, for iframe 309, the analyzer 223 would determine that the script element node 311 contains a script, and the modifier 224 would insert the hook before and after the script contained in the element node 311 to wrap the script. Also, the modified web page may also be stored at a location in the storage 225 corresponding to a suffixed URL that suffixes the proxy server's URL to the original document's URL. Here, since the original web page document has a domain www.c.com, the suffixed URL would be under a domain www.c.com.cas.ms 323.

The ellipses 331-339 represent that there may be additional element nodes contained in the web page document 300. Each of these element nodes may also be analyzed by the analyzer 223. If additional scripts exist, the same hook may be inserted before and after each of these additional scripts.

Figure 4A:
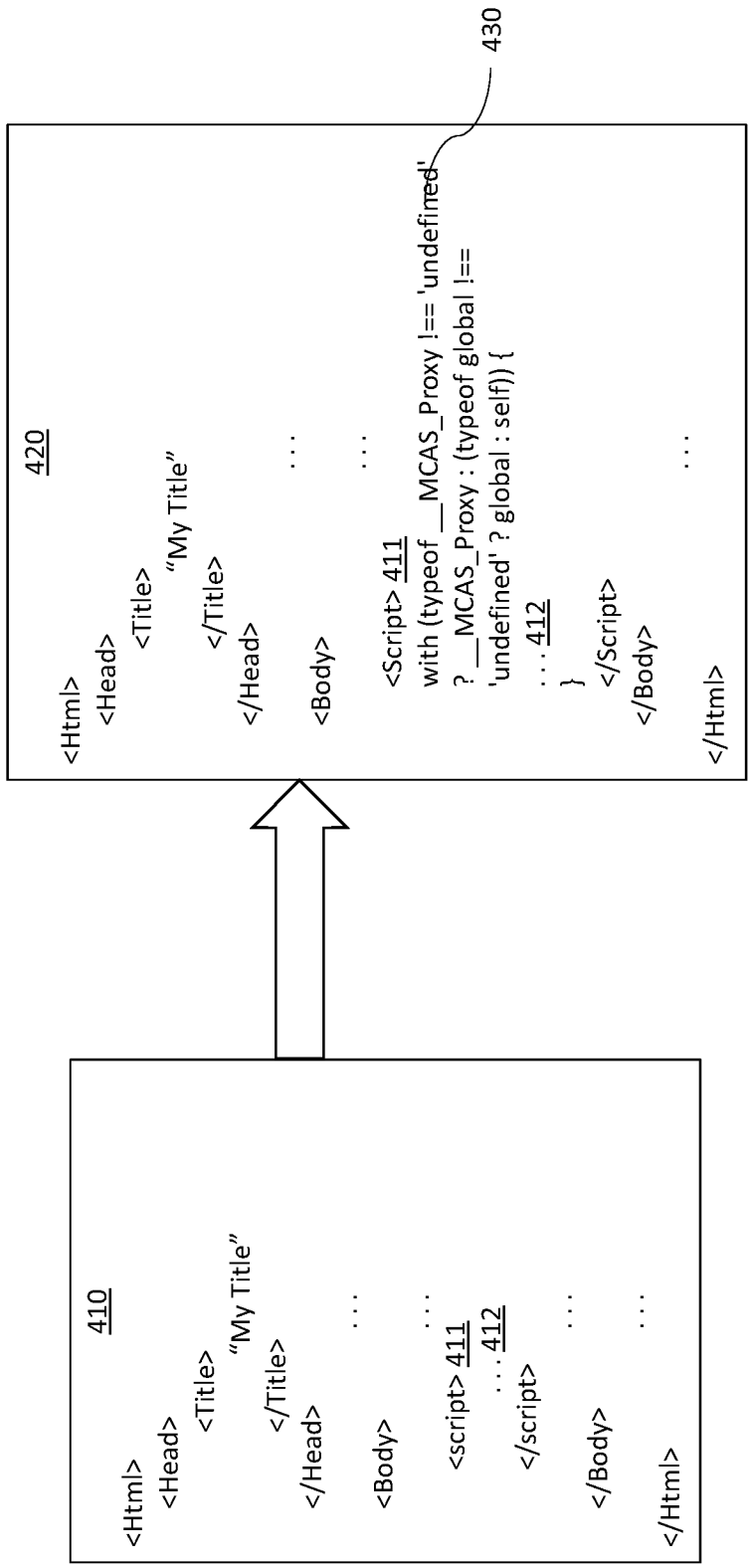
FIG. 4A illustrates an example original web page document including a script and a modified example web page document that is modified by a proxy server.

The principles described herein are advantageous compared to the existing solutions implemented in the proxy services. In particular, the analyzer 223 only needs to analyze the web page document, but not to parse the script code, and the modifier 224 only needs to insert a line of code before and after the detected object, but not to wrap or modify each of the targeted functions contained in the script code. FIG. 4A illustrates an example modified web page document 420 compared to an example original web page document 410, which further demonstrates the advantages of the solution offered by the principles described herein.

The left side of FIG. 4A illustrates an example web page document 410, which includes at least one element node 411 that contains a script 412. The right side of FIG. 4A illustrates a modified example web page document 420, which is substantially the same as the original web page document 410, except that a browser hook, which is a line of code 430, is inserted before and after the script 412 contained in the element node 411, such that the script 412 contained in the element node 411 is wrapped by the line of code 430.

Figure 4B:
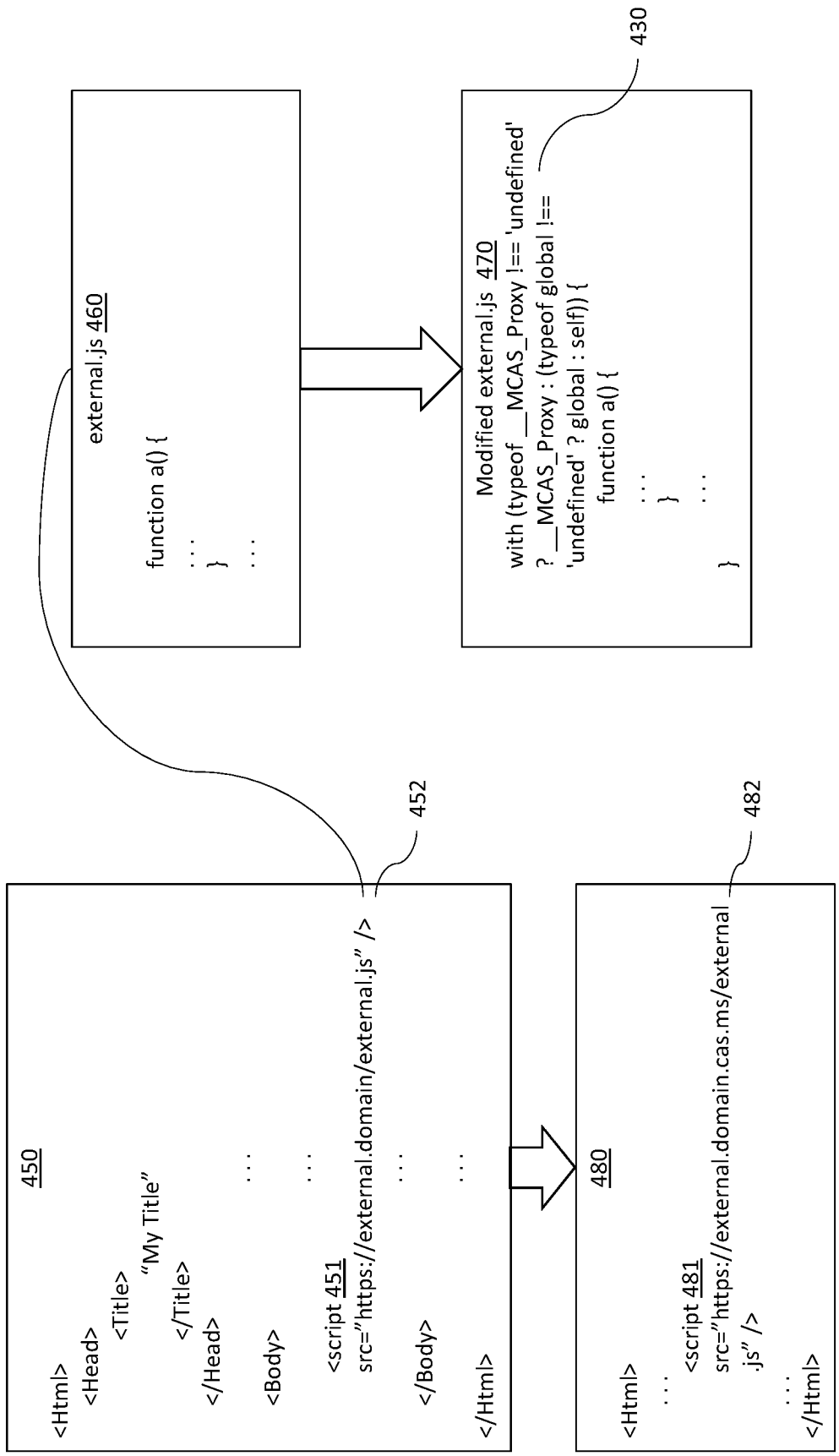
FIG. 4B illustrates an example original web page document embedding a script document, an example original script document that is embedded in the example original web page document, and a modified script document that is modified by a proxy server.

In some cases, the web page document does not directly contain scripts. Instead, the scripts may be contained in a script document, which may then be embedded in the web page document via a URL of the script document. Such a situation is further illustrated in FIG. 4B. FIG. 4B illustrates an example web page document 450, an example javascript document 460, and a modified example javascript document 470.

Referring to FIG. 4B, the example web page document 450, similar to the example webpage document 410 illustrated in FIG. 4A, also includes a script node 451 tagged by a <script> tag. However, the script node 451 in the web page document 450 does not directly include any script. Instead, the script node 451 embeds a URL 452 of a script document https://external.domain/external.js. The URL 452 indicates where the script document external.js is stored. Based on the URL 452, the proxy server may then retrieve the "external.js" 460 from the external.domain. The retrieved "external.js" may then be modified by inserting the same browser hook (i.e., the line of code 430) into the script document. Similarly, the proxy server does not need to parse each line of the script in the script document 460, but only insert the line of code 430 before the first line of script document 460, and after the last line of the script document 460, such that all the code contained in the script document 460 is wrapped by the line of code 430. The modified script document 470 may then be stored at the proxy server. At the same time, the web page document 450 may also be modified to include the new URL of the modified script document 470. For example, the modified web page document 480 may include a script node 480 that embeds the new URL 482 that is suffixed by the proxy server. If the proxy server's domain is cas.ms, the suffixed URL of the external.js 470 may become https://external.domain.cas.mes/external.js.

As illustrated in FIGS. 4A and 4B, the same line of code 430 may be inserted in the web page document 410 or in the script document 460. The line of code 430 may include a JavaScript's "with" statement. The syntax of the "with" statement includes an expression and a statement, e.g., "with (expression) {statement}." In the example "with" statement, the expression states "(typeof_MCAS_Proxy !=='undefined' ? _MCAS_Proxy: (typeof global !=='undefined' ? global: self)", which is configured to call one or more additional functions contained in a library. For example, the expression "_MCAS_Proxy" may be a global variable or function predefined in the library. Further, the "with" statement includes a block statement "{ }" that wraps the original script 412 contained in the element node 411.

The expression of the "with" statement 430 is structured such that when executed by a browser client, it causes the browser client to traverse each of the script objects contained in the script 412, and determines whether one or more predetermined conditions are met. In response to a determination that at least one of the one or more predetermined conditions are met, the client browser is caused to replace some of the script objects to proxy objects. The at least one of the one or more predetermined conditions may include (but are not limited to) (1) the script object is not a proxy object; (2) a cached proxy object that corresponds to the script object is not found; (3) the script object is not a primitive object; (4) the script object is not an array; (5) the script object is a native object; and/or (6) the script object is a function object that is not on a whitelist of approved functions.

For example, it may first be determined whether a script object is not a proxy object. If the script object is already a proxy object, the same object may be returned. It may also be determined whether a cached proxy object that corresponds to the script object is found. If a cached proxy object is found, the cached proxy object may then be returned. It may also be determined whether the script object is a primitive object. If the script object is a primitive object, the same object may be returned.

It may also be determined whether the script object is a native object. In JavaScript, native objects are those objects supplied by JavaScript. Examples of these are String, Number, Array, Image, Date, Math, etc. If the script object is not a native object, the same object may be returned. If the script object is a native object, the script object may be rewritten into a proxy object. Further, it may also be determined whether the script object is a function object. If the script object is a function object, the function object may be compared with a whitelist of functions that are approved by the proxy server. If the function object is on the whitelist, the function object may be returned as it is; and if the function object is not on the whitelist, the function object may be rewritten into a proxy object or vice versa.

It may also be determined whether the script object is an array. If the script object is an array, each element in the array may then be analyzed individually based on the above-described process. For example, for each of the element(s) contained in the array, it may be determined whether the element is a native object. If the element is a native object, the native object may be rewritten into a proxy object.

A proxy object is a script object in JavaScript that wraps an original object or a function and monitors the script object via a "handler". FIG. 5A illustrates an example proxy generating function 500 that may be included in the library and be called by the global variable "MACS Proxy" included in the browser hook 430 of FIG. 4. The proxy generating function 500A is defined as function generateProxyForObj(obj). The function 500 uses a series of "if" expressions 510, 520, 530, and 540 to determine whether various conditions are satisfied. For example, the first "if" expression 510 is configured to determine whether a script object is a JavaScript object. Only when the script object is a JavaScript object, the other conditions included in if expressions 520-540 are then determined. For example, the "if" expression 520 is configured to determine whether the script object is already a proxied object; the next "if" expression 530 is configured to determine whether a cached proxy object exists; and the last "if" expression 540 is configured to determine whether the script object is a simple array. If none of these "if" expressions 520-540 is true, a new proxy object (proxiedObj) is created (see statement 550).

The syntax for defining a new proxy object in JavaScript is "var p=new Proxy (target, handler)." The parameter "target" is a target object that is to wrap with Proxy. It can be any type of object, including a function. A handler is also a script object whose properties are functions that define the behavior of the proxy when an operation is performed on it. The handler may be defined based on the needs of the proxy server. For example, a handler may be used to monitor whether a download button is clicked. As another example, a handler may be used to monitor whether a user is trying to modify a document stored at the server. Various secure functions may be implemented via the handler. For example, certain users or unapproved clients may be rejected to perform certain operations. When an operation is rejected, the browser may be caused to generate a notification to notify a user that the requested operation is rejected.

As illustrated in FIG. 5A, a function object "getHandler" is used to define the handler of the proxy object that is being generated. In some embodiments, the "getHandler" function may be structured such that when certain event occurs, the "getHandler" function is caused to call the proxy generating function "generateProxyForObj," such that a recursive process is performed to cause the browser client to generate additional proxy objects repetitively from the existing proxy objects.

FIGS. 5B-5D further illustrate several example functions 500B-500D that may also be included in the library to work with the proxy generating function 500A. For example, FIGS. 5B-5C illustrate a "myGetHandler" function 500B and "getHandler" function 500C. The "getHandler" function 500C may call the "myGetHandler" function 500B, which in turn may call the "generateProxyForObj" function 500A to form a recursive process. FIG. 5D illustrates an example statement that defines a global variable window._MCAS_Proxy 500D that calls the "getHandler" function 500C. As such, when a global variable window._MCAS_Proxy is generated, the "getHandler" function 500C, "myGetHandler" function 500B, and "generateProxyForObj" function 500A may be recursively called to create one or more proxy objects.

Figure 5E:
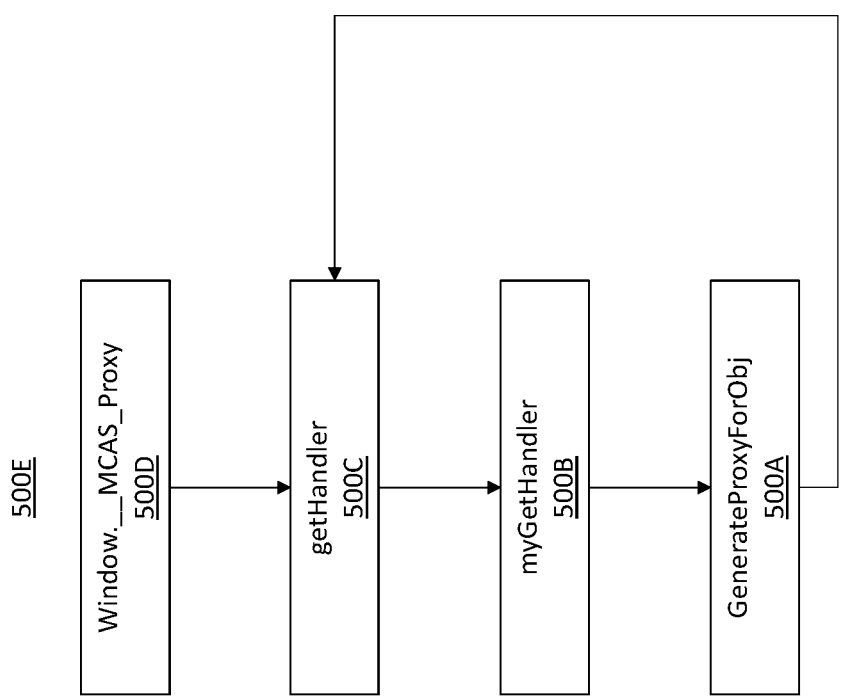
FIG. 5E illustrates a flowchart of a recursive proxy generating process.

Such a recursive process is further illustrated in FIG. 5E. FIG. 5E illustrates a flowchart of an example recursive process for generating and monitoring proxy objects. Referring to FIG. 5E, when a global variable window._MCAS_Proxy 500D is created, the "getHandler" function 500C may be called. The "getHandler" function 550C may, in turn, call the "myGetHandler" function 500B, which may then, in turn, call the "getHandler" function 500C. As such, once a proxy object is generated, the generated proxy object may trigger additional proxy objects to be generated depending on the occurring event.

The example functions and statements illustrated in FIGS. 4 and 5A-5D are merely semantic frameworks to show the general purposes of various programming modules. Additional modifications and libraries may be required to make the example code fully function. Alternatively, or in addition, different function names may be used, and different and/or additional programming statements and frameworks may be implemented to achieve the same or similar purposes as the principles described herein.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
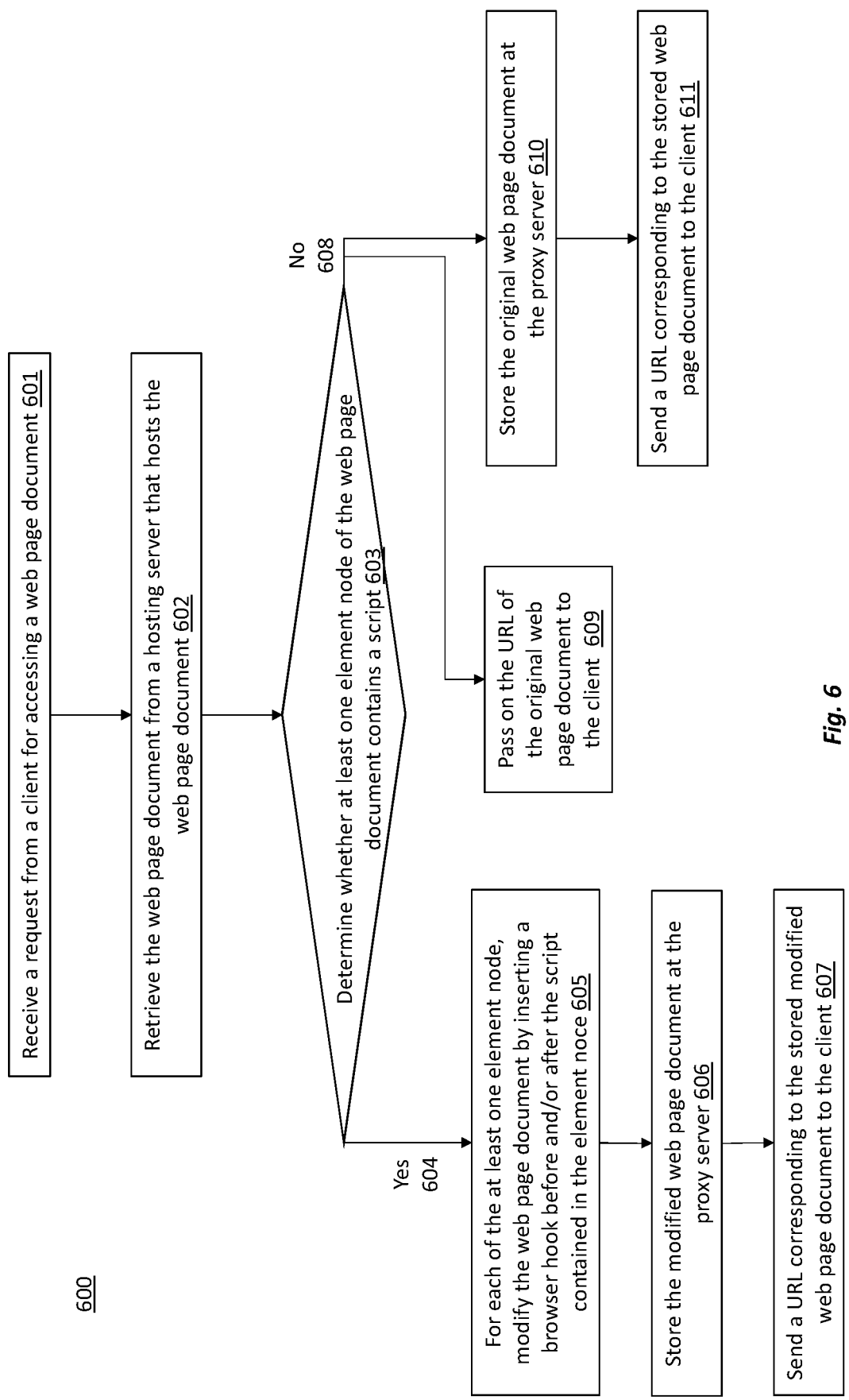
FIG. 6 illustrates a flowchart of an example method that may be performed at a proxy server for modifying a web page by inserting browser hooks.

FIG. 6 illustrates a flowchart of an example method 600 for inserting browser hook(s) into a web page document, which may be implemented at a proxy server that corresponds to the proxy server 220 of FIG. 2. The method 600 includes receiving a request from a client for accessing a web page document (act 601). In response to receiving the request, the proxy server 220 may retrieve the web page document from a hosting server 240 that hosts the web page document (act 602). The proxy server 220 may then determines whether at least one element node contains a script (act 603), which may be achieved by traversing each of the multiple element nodes to determine whether each element node contains a script.

In response to a determination that at least one element node of the web page document contains a script (604), for each of the at least one element node, the proxy server 200 may modify the web page document by inserting a browser hook before and/or after the script contained in the corresponding element node (act 605). The modified web page document may then be stored at the proxy server 220 (act 606). The proxy server 220 eventually sends a URL that corresponds to the stored modified web page document to the client (act 607). For example, the proxy server 220 may be a suffix proxy, which suffixes its own domain name to the URL of the original web page document. If the URL of the original web page document is www.a.com/webpage.html, and the suffix proxy's domain name is www.cas.ms, the suffixed URL would be www.a.com.cas.ms/webpage.html.

On the other hand, if it is determined that there is no object that is embedded in the web page document (608), the proxy server 200 may pass on the URL of the original web page document to the client (act 609). Alternatively, the proxy server may still store a copy of the original web page document at its own storage (act 610), and send a URL corresponding to the copied web page document to the client (act 611).

Figure 7:
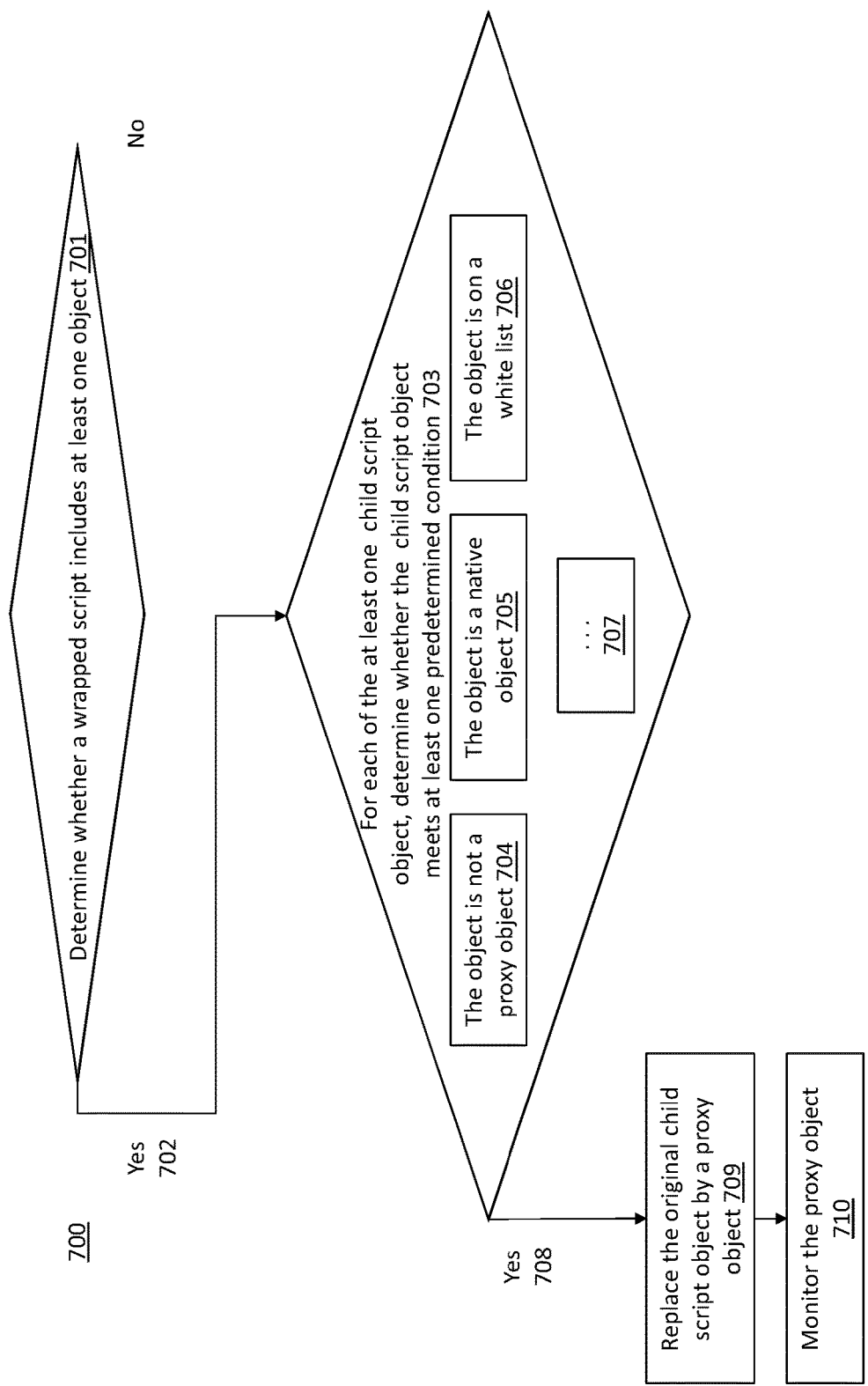
FIG. 7 illustrates a flowchart of an example method for conditionally replacing script objects by proxy objects when a modified web page is executed by a client.

FIG. 7 illustrates a flowchart of an example method 700 for replacing certain objects by proxy objects, which may be performed by the client when the client executes a script that is wrapped by the inserted browser hook. The method 700 includes determining whether the hook-wrapped script includes at least one object (act 701). In response to a determination that at least one object is included in the script (702), for each of the at least one object, it is then determined whether the script object meets at least one of one or more predetermined conditions (act 703). The one or more predetermined conditions may include (but are not limited to) whether the script object is not a proxy object (704), whether the script object is a native object 705, and/or whether the script object is a function object that is on a whitelist (706). The ellipsis 707 represents that there may be any number of additional conditions that may be determined.

In response to the determination that at least one of the one or more conditions is satisfied (708), the original object may then be replaced by a proxy object (act 709). The proxy object uses the original object as its target, and the proxy object may then be monitored by a predefined handler (act 710).

Finally, because the principles described herein may be performed in the context of a computing system (for example, each of the clients 110-113 and 210, each of the proxy servers 120, 120B, 120C, and 220, and each of the web servers 140-143, and 240 may include one or more computing systems) some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
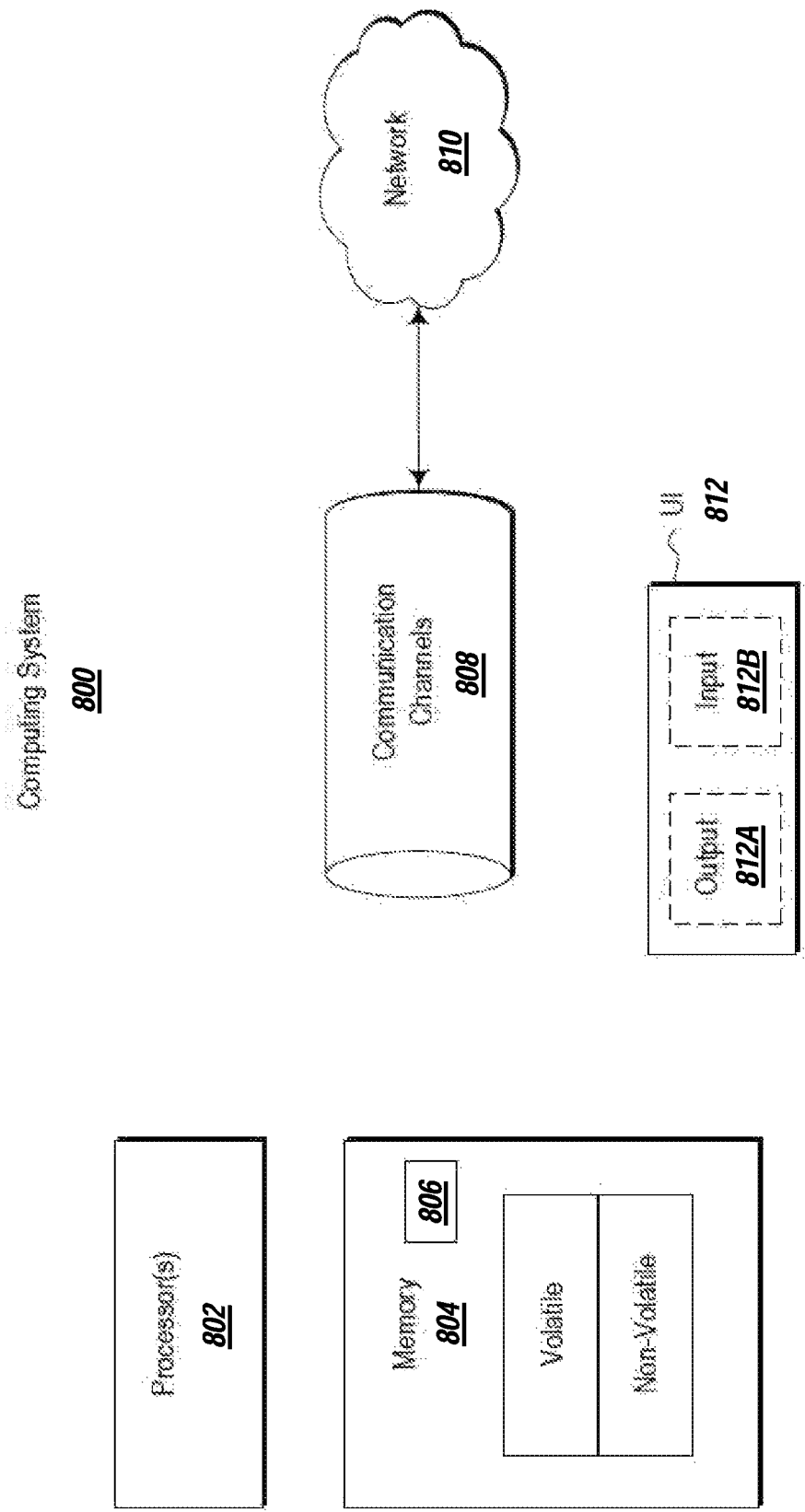
FIG. 8 illustrates an example computing system in which the principles described herein may be employed.

As illustrated in FIG. 8, in its most basic configuration, a computing system 100 typically includes at least one hardware processing unit 802 and memory 804. The processing unit 802 may include a general-purpose processor and may also include a field-programmable gate array (FPGA), an application-specific integrated circuit (ASIC), or any other specialized circuit. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 also has thereon multiple structures often referred to as an "executable component". For instance, memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 104 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms and so forth. Examples of input mechanisms 812B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 800 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 802 and memory 804, as needed to perform their various functions.

As mentioned above, each of the clients 110-113 and 210, the proxy servers 120, 120B, 120C, and 220, and the web servers 140-143, and 240 may include one or more computing systems. As such, the principles described herein are implemented in an environment including one or more computing systems that are configured to communicate with each other directly or indirectly via computer networks. In particular, the method of inserting browser hooks into web pages described herein may be implemented at a proxy server 220 to simplify the process of providing secure access to various web content, such that resources of the proxy server 220 may be more efficiently utilized, and that certain recursive computing process is distributed to the browser clients, which improves the functions of the computing systems of both the proxy server 220 and the browser clients.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A computing system comprising:
one or more processors; and
one or more computer-readable media having thereon computer-executable instructions that are structured such that, when executed by the one or more processors, the instructions cause the computing system to perform a method for inserting a browser hook in a web page document or a script document for conditionally replacing a script object by a proxy object, the method comprising:
receiving a request from a client for accessing a web page document having a tree structure that contains a plurality of element nodes or a script document, the request including a URL that corresponds to a location where the web page document or the script document is hosted, the script document comprising instructions that are executable by the client;
in response to the request for accessing the web page document,
retrieving the web page document from a hosting server that hosts the web page document based on the URL;
determining whether at least one element node of the web page document contains a script or embeds a script document via a URL of the script document, the script or the script document comprising instructions that are executable by the client;

in response to a determination that at least one element node contains a script, for each of the at least one element node, modifying the web page document by inserting a browser hook in the element node, or modifying the script document by inserting a browser hook in the script document, the browser hook comprising a predetermined line of code that is configured to wrap the script contained in the element node; and sending the modified web page document or the modified script document to the client, in response to the request for accessing a script document or in response to the determination that the web page document embeds a script document via a URL, retrieving the script document from a hosting server that hosts the script document based on the URL; and modifying the script document by inserting a browser hook in the script document.

2. The computing system of claim 1, the sending the modified web page document comprising:

storing the modified web page document or the modified script document at a location that is hosted by the computing system, the location corresponding to a new URL; and sending the new URL to the client.

3. The computing system of claim 2, the new URL being generated by suffixing a domain name associated with the computing system to the original URL of the web page document.

4. The computing system of claim 1, the determining whether at least one element node contains a script comprising:

traversing each of the plurality of the element nodes of the web page document;

for each of the plurality of element nodes, determining whether the element node contains a script.

5. The computing system of claim 4, the determining whether the element node contains a script comprising determining whether the element node is tagged by at least one particular tag that indicates that the element node is a script document node.

6. The computing system of claim 5, wherein the at least one particular tag comprises a "<script>" tag, in response to a determination that an element node is tagged by a "<script>" tag, determining that the element node contains a script written in JavaScript.

7. The computing system of claim 6, in response to a determination that at least one element node contains a script written in Javascript, for each of the at least one element node, inserting a browser hook that includes a JavaScript "with" statement before and after the script, the JavaScript "with" statement taking the script as a statement, such that the script is wrapped by the JavaScript "with" statement.

8. The computing system of claim 1, the browser hook being structured such that when executed by the client, the browser hook causes the client to perform at least the following:

determine whether the script contained in the element node includes at least one script object;

in response to a determination that the script includes at least one script object, for each of the at least one script object, determine whether the script object meets one or more predetermined conditions; and in response to a determination that the script object meets at least one of the one or more predetermined conditions, replace the script object by a proxy object, the proxy object being formed by generating a new proxy object that wraps the script object.

9. The computing system of claim 8, the replacing the script object by a proxy object comprising generating a new proxy object in JavaScript, the new proxy object taking the script object as a target.

10. The computing system of claim 9, the proxy object being structured such that when executed by the client, the proxy object is being monitored via a handler object.

11. The computing system of claim 10, the monitoring the proxy object comprising:

detecting whether one or more particular events at the proxy object occur.

12. The computing system of claim 11, wherein in response to a detection of at least one of the one or more particular events occurring, causing an operation of the corresponding event to be blocked or performed.

13. The computing system of claim 12, wherein when an operation of the corresponding event is blocked, causing the client to generate a notification to notify a user that the operation has been blocked.

14. The computing system of claim 11, wherein in response to a detection of at least one of the one or more particular events occurring, causing a new proxy object to be generated, such that a previously generated proxy object is configured to cause an additional proxy object to be generated, which forms a recursive process.

15. The computing system of claim 8, the one or more predetermined conditions comprising at least one of the following:

(1) the script object is not a proxy object;

(2) a cached proxy object that corresponds to the script object is not found;

(3) the script object is not a primitive object;

(4) the script object is not an array;

(5) the script object is a native object; or (6) the script object is a function object that is not on a whitelist of approved functions.

16. The computing system of claim 15, the browser hook being further structured such that when executed by the client, the browser hook causes the client to perform the following:

in response to a determination that a cached proxy object that corresponds to the script object is found, replace the script object by the cached proxy object.

17. The computing system of claim 15, the browser hook being further structured such that when executed by the client, the browser hook causes the client to perform the following:

in response to a determination that the script object is a function object, access a whitelist that contains a list of approved functions;

determine whether the function object is on the whitelist; and in response to a determination that the function object is not on the whitelist, replace the function object by a proxy object.

18. The computing system of claim 15, the browser hook being further structured such that when executed by the client, the browser hook causes the client to perform the following:

in response to a determination that the script object is an array, determine whether the array contains at least one script object element;

in response to a determination that the array contains at least one script object element, for each of the at least one script object element, determine whether the script object element meets at least one of the one or more predetermined conditions; and in response to the determination that the corresponding object meets the at least one predetermined condition, replace the script object element by a proxy object.

19. A method implemented at a computing system for inserting browser hooks in a web page document or a script document for conditionally replacing a script object by a proxy object, the method comprising:

receiving a request from a client for accessing a web page document having a tree structure that contains a plurality of element nodes or a script document, the request including a URL that corresponds to a location where the web page document or the script document is hosted, the script document comprising instructions that are executable by the client;

in response to the request for accessing the web page document, retrieving the web page document from a hosting server that hosts the web page document based on the URL;

determining whether at least one element node of the web page document contains a script or embeds a script document via a URL of the script document, the script or the script document comprising instructions that are executable by the client;

in response to a determination that at least one element node contains a script, for each of the at least one element node, modifying the web page document by inserting a browser hook in the element node, or modifying the script document by inserting a browser hook in the script document, the browser hook comprising a predetermined line of code that is configured to wrap the script contained in the element node; and sending the modified web page document or the modified script document to the client, in response to the request for accessing a script document or in response to the determination that the web page document embeds a script document via a URL, retrieving the script document from a hosting server that hosts the script document based on the URL; and modifying the script document by inserting a browser hook in the script document.

20. A computer program product comprising one or more hardware storage devices having stored thereon computer-executable instructions that are structured such that, when executed by one or more processors of a computing system, the computer-executable instructions cause the computer system to perform a method for inserting browser hooks in a web page document or a script document for conditionally replacing a script object by a proxy object, the method comprising:

receiving a request from a client for accessing a web page document having a tree structure that contains a plurality of element nodes or a script document, the request including a URL that corresponds to a location where the web page document or the script document is hosted, the script document comprising instructions that are executable by the client;

in response to the request for accessing the web page document, retrieving the web page document from a hosting server that hosts the web page document based on the URL;

determining whether at least one element node of the web page document contains a script or embeds a script document via a URL of the script document, the script or the script document comprising instructions that are executable by the client;

in response to a determination that at least one element node contains a script, for each of the at least one element node, modifying the web page document by inserting a browser hook in the element node, or modifying the script document by inserting a browser hook in the script document, the browser hook comprising a predetermined line of code that is configured to wrap the script contained in the element node; and sending the modified web page document or the modified script document to the client, in response to the request for accessing a script document or in response to the determination that the web page document embeds a script document via a URL, retrieving the script document from a hosting server that hosts the script document based on the URL; and modifying the script document by inserting a browser hook in the script document.

\* \* \* \* \*